(12) United States Patent
Nakatani (10) Patent No.: US 6,233,354 B1
(45) Date of Patent: May 15, 2001

(54) CHARACTER RECOGNITION DEVICE

(75) Inventor: Yuichi Nakatani, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/272,312

(22) Filed: Mar. 19, 1999

(30) Foreign Application Priority Data

Mar. 19, 1998 (JP) .................................. 10-069172

(51) Int. Cl.⁷ ...................................................... G06K 9/00
(52) U.S. Cl. ............................................. 382/224; 382/310
(58) Field of Search .................................... 382/224, 226, 382/227, 229, 230, 209, 310, 159, 178, 218

(56) References Cited

U.S. PATENT DOCUMENTS 5,164,996 * 11/1992 Pastor ...................................... 382/25
5,504,822 * 4/1996 Holt ...................................... 382/218
5,544,260 * 8/1996 Chefalas et al. ...................... 382/187
5,883,986 * 3/1999 Kopec et al. .......................... 382/210

FOREIGN PATENT DOCUMENTS 55-97671 7/1980 (JP) .
6-348911 12/1994 (JP) .

* cited by examiner

*Primary Examiner*—Bijan Tadayon
*Assistant Examiner*—Seyed H. Azarian
(74) *Attorney, Agent, or Firm*—Foley & Lardner (57) ABSTRACT

The key character selection means selects a character candidate as a standard when evaluating the size information of the extracted area of other character candidates. The doubtful character selection means evaluates size information of the extracted areas of other character candidates making the size information of the extracted area of the key character the standard, and selects the character candidate having deviated size information as a doubtful character. The character reconfirmation means makes the size information of the extracted area of the key character the standard and infers the size information of the extracted area of the relevant character candidate for each character candidate selected by the doubtful character selection means, and carried out extraction of the relevant character candidate by the input word image based on this size information, and carries out character recognition by matching the external frame of the extracted area with the character frames of the template of the character recognition dictionary.

3 Claims, 12 Drawing Sheets

| HORIZONTAL WIDTH OF CHARACTER E | VERTICAL WIDTH OF CHARACTER E | SCORE |
|---|---|---|
| (OMITTED) | | |
| 6 | 5 | 40 |
| 6 | 6 | 40 |
| 6 | 7 | 30 |
| 6 | 8 | 20 |
| 6 | 9 | 30 |
| 6 | 10 | 40 |
| (CONTINUES BELOW) | | |

Fig. 2B

| (OMITTED) | | |
|---|---|---|
| CHARACTER E, WHEN THE HORIZONTAL WIDTH IS 6, THE VERTICAL WIDTH IS 8 | | |
| HORIZONTAL WIDTH OF CHARACTER L | VERTICAL WIDTH OF CHARACTER L | SCORE |
| (OMITTED) | | |
| 2 | 6 | 80 |
| 2 | 7 | 80 |
| 2 | 8 | 80 |
| 2 | 9 | 70 |
| (CONTINUES BELOW) | | |

Fig. 2C

| (OMITTED) | | |
|---|---|---|
| CHARACTER E, WHEN THE HORIZONTAL WIDTH IS 6, THE VERTICAL WIDTH IS 8 | | |
| CHARACTER | HORIZONTAL WIDTH | VERTICAL WIDTH |
| L | 7 | 8 |
| N | 7 | 8 |
| (CONTINUES BELOW) | | |

APPl E

1. APP▢E  MATCHING THE UPPER LEFT

2. APP▢E  MATCHING THE LOWER LEFT

3. APP▢ E  MATCHING THE UPPER RIGHT

4. APP▢ E  MATCHING THE LOWER RIGHT

Fig. 15A   Fig. 15B   Fig. 15C

DICTIONARY SIDE

| FONT NUMBER | CHARACTER A, VERTICAL WIDTH | CHARACTER E, VERTICAL WIDTH | CHARACTER L, VERTICAL WIDTH | CHARACTER P, VERTICAL WIDTH | ... | CHARACTER Z, VERTICAL WIDTH |
|---|---|---|---|---|---|---|
| 1 | 16 | 20 | 14 | 18 | ... | 10 |
| 2 | 16 | 10 | 20 | 25 | ... | 10 |
| ... | ... | ... | ... | ... | ... | ... |
| (CONTINUED BELOW) | | | | | | |

CHARACTER RECOGNITION DEVICE

BACKGROUND OF THE INVENTION

1. Field of the Invention

The present invention relates to a character recognition device, and in particular to a character recognition device which inputs an image of a series of characters and outputs the results of recognition of individual characters.

2. Description of the Related Art

When recognizing words given as an image, conventionally, for example, as in Japanese Patent Application, First Publication, No. Hei 6-348911, the word image is converted into two colors, the circumscribing rectangle which circumscribes the black pixel concatenated component is found, these circumscribing rectangles are integrated based on the graphical characteristics such as the distances between the surrounding circumscribing rectangles, the integrated rectangular areas are subject to character recognition, the character recognition result is checked against correct word spellings stored in a dictionary, and as a result the character with the largest degree of agreement is output.

A problem in the above-described conventional technology is that when there is a character with a part missing in the image, it cannot be correctly read. The reason is that when the rectangular area is subject to character recognition, it is assumed that its circumscribing rectangle matches a character frame of a character in the character recognition dictionary. This assumption does not hold when a part of the character is missing, and there is the concern that the result of the character recognition of this character will be obviously lacking validity.

Figure 15A:
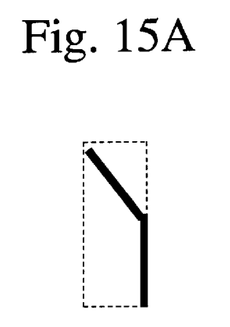
FIGS. 15A, 15B, and 15C are drawings for explaining topics related to the conventional technology.
Figure 15B:
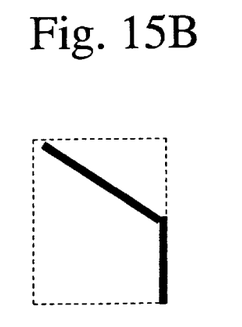
Figure 15C:
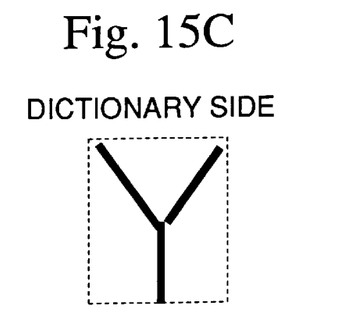

For example, assume that an image including the character 'Y' is extracted as shown in FIG. 15A. FIG. 15A is the case that one part of the right side of 'Y' is missing. In contrast, assume that the template for the 'Y' character type as shown in FIG. 15C is provided in the character recognition dictionary.

Generally, the character recognition device calculates the degree of similarity from the match between the circumscribing rectangle in the recognition object image and the character frame of the template in the character recognition dictionary. For example, the degree of similarity is calculated with FIG. 15C after FIG. 15A is transformed into FIG. 15B in order to match the character frame of the template. Because the degree of similarity between FIG. 15B after transformation and the template shown in FIG. 15C is low, this causes a recognition error.

That is, if an extracted character has a missing part, there is the problem that a correct character recognition result will not be obtained because the similarity with the template of the correct character type is low, or because of the possibility that by chance there may be a high degree of similarity with the template of a character type other than the correct one.

SUMMARY OF THE INVENTION

An object of the present invention is to provide a means for recognizing at a word image having a character with a missing part a higher degree of reliability.

The present invention provides a key character selection means (reference number 22 in FIG. 1) which finds the degree of independent confidence based on the recognition result and size information of an extracted character candidate, and selects the character candidate with a high degree of independent confidence as a key character; a doubtful character selection means (reference number 23 in FIG. 1) which uses the size information of the key character as a standard, and finds the degree of relative confidence of the relevant character candidate from the results of recognition of other candidate characters and size information, and selects character candidates with a low degree of relative confidence as doubtful characters; and a character reconfirmation means (reference numeral 24 in FIG. 1) which uses the size information of the key character as a standard, infers the size information of the selected doubtful character, and carries out extraction and character recognition of the doubtful character once again based on such size information.

The key character selection means selects character candidates to be used as the standard when evaluating the size information of the extracted area of the other character candidates. The doubtful character selection means infers the size information of the extraction area of other character candidates using the size information of the extraction area of the key characters as the standard, and selects candidates having deviating size information as doubtful characters. The character reconfirmation means evaluates the size information of the extraction area of the relevant character candidate with respect to each character candidate selected by the doubtful character selection means, carries out extraction of the relevant character candidate by the input word image based on this size information, and applies character recognition by matching the character frames of the template of the character recognition dictionary with the outer frame of the extracted area.

DESCRIPTION OF THE EMBODIMENTS

First Embodiment

Figure 1:
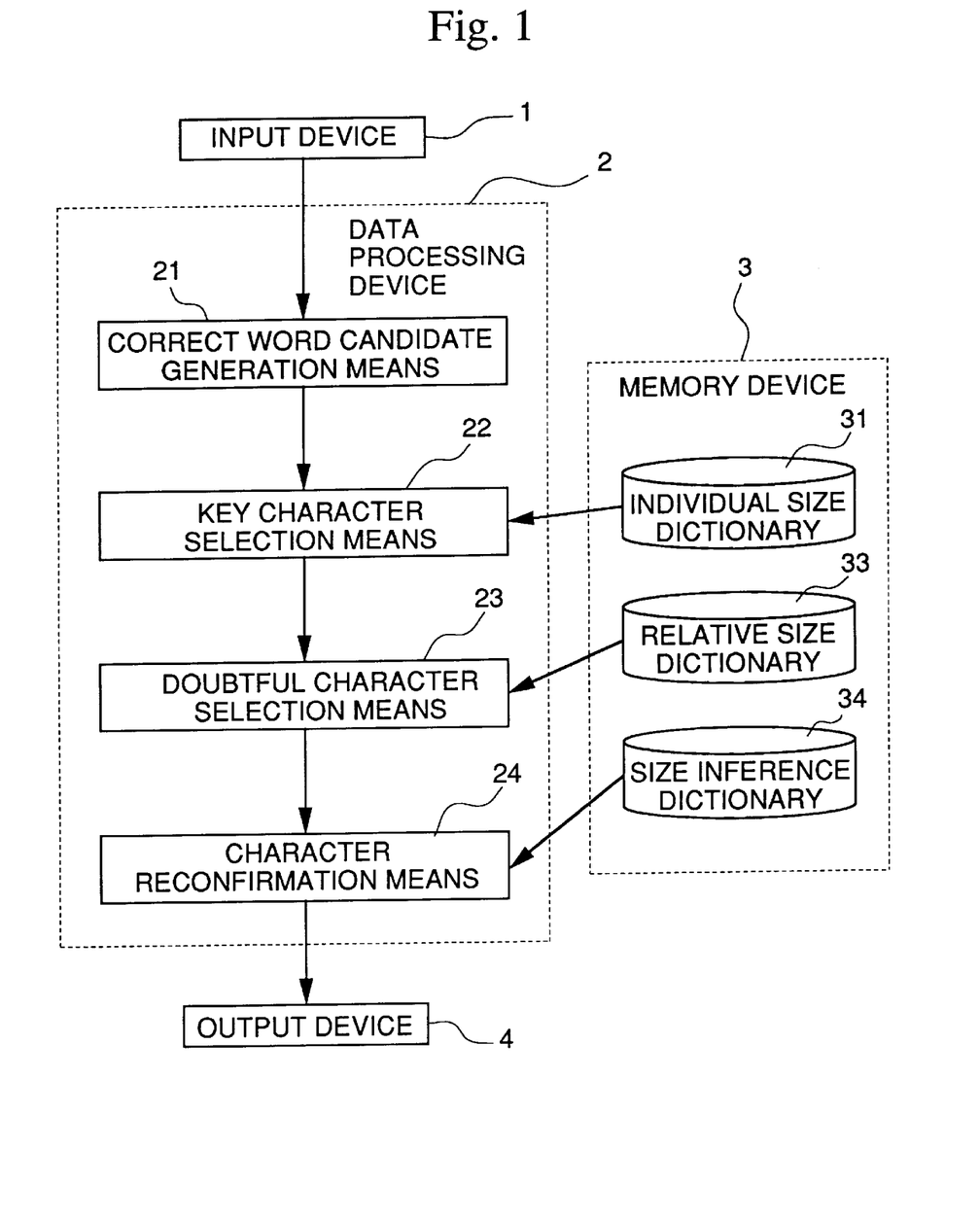
FIG. 1 is a block diagram showing the structure of the first embodiment of the present invention.

Below, referring to the figures, the first embodiment of the present invention will be explained in detail. FIG. 1 is a block diagram for explaining the structure of the present embodiment. Referring to FIG. 1, the character recognition device of the present embodiment comprises the input device 1, the data processing device 2, the memory device 3, and the output device 4.

The input device 1 is a device which inputs the word image which becomes the object of recognition.

The data processing device 2 comprises a correct word candidate generating means 21, a key character selection device 22, a doubtful character selection means 23, and a character reconfirmation means 24.

The correct word candidate generation means 21 carries out character extraction and character recognition for the recognition object word image input by the input means 1, and generates the correct word candidates by combining the character types which are the result of the character recognition.

The key character selection means 22 calculates the degree of confidence of each of the candidate characters included in each of the correct word candidates that the correct word candidate generation means 21 generates (referred to hereinbelow as the "degree of independent confidence") based on the recognition results and the size information of the relevant character candidates.

The degree of independent confidence is calculated using, for example, a character recognition score for these character candidates, an independent size score obtained by referring to an independent size dictionary 31 which is based on the size information of the relevant character candidate, the height of the lower edge of the circumscribing rectangle of this character candidate seen from the base line, the vertical and horizontal lengths of the circumscribing rectangle of these character candidates, and the gap between the circumscribing rectangle of the character candidates surrounding this character candidate.

The doubtful character selection means 23 calculates the degree of confidence for each of the character candidates besides the key characters included in each correct word candidate (referred to hereinbelow as the "degree of relative confidence") based on the recognition results and the size information of the relevant character candidates. Additionally, this degree of relative confidence selects character candidates below a threshold value as doubtful characters.

The degree of relative confidence is calculated using, for example, the character recognition score of these character candidates, the relative size score obtained by referring to the relative size dictionary 33 based on the size information of the key characters and the relevant character candidates, the height of the lower edge of the circumscribing rectangle of these character candidates seen from a base line, the vertical and horizontal length of the circumscribing rectangles of these character candidates, and the gap between the circumscribing rectangle of the character candidates and the surrounding character candidates.

The output device 42 determines the size information of the extraction area of the doubtful characters by referring to the size inference dictionary 34, re-extracting the doubtful characters form the recognition object word image according to this size information, and carrying out character recognition. Additionally, based on this result, the recognition score of the doubtful characters is corrected.

The memory device 3 stores the independent size dictionary 31, the relative size dictionary 33, and the size inference dictionary 34.

Figure 2A:
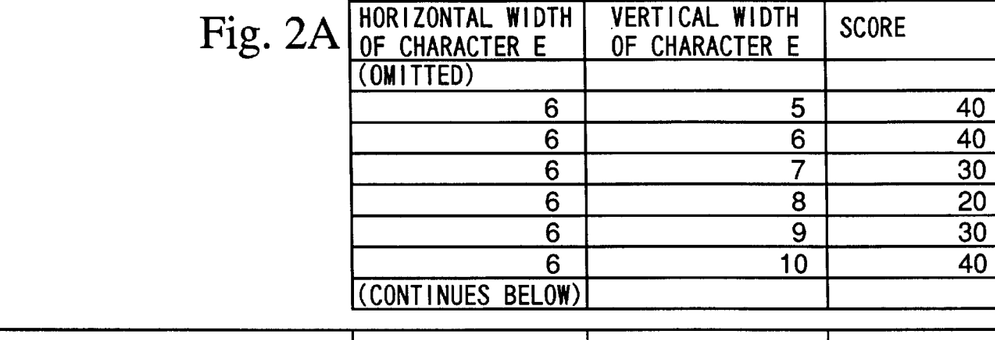
FIGS. 2A, 2B and 2C are drawings showing the independent size dictionary, relative size dictionary, and the size inference dictionary.
Figure 2B:
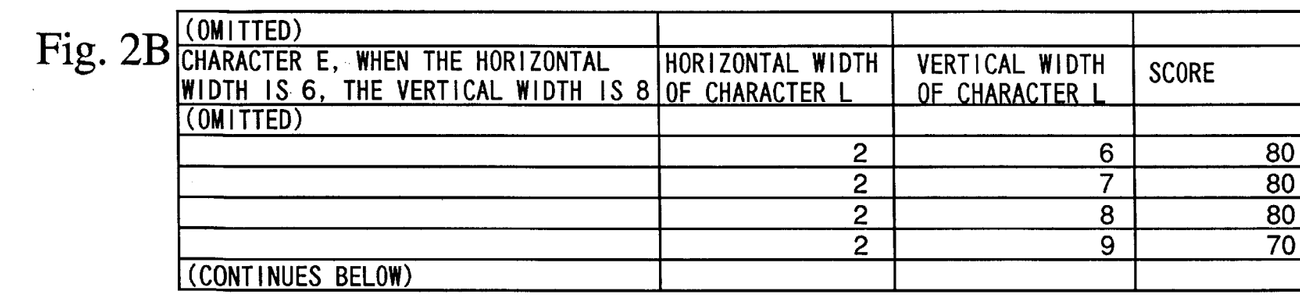
Figure 2C:
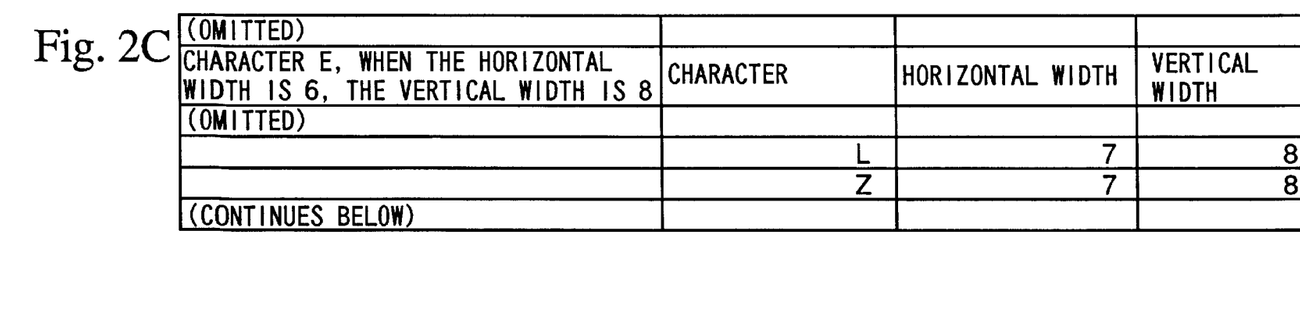

FIG. 2 is a drawing for explaining a concrete example of the independent size dictionary 31, the relative size dictionary 33, and the size inference dictionary 34.

The independent size dictionary 31 stores as the independent size score the score in the case that this character of the character type has size information of this character for combinations of the size information of the character type and this character.

For example, FIG. 2A shows the state wherein, in relation with the character type E, the size information is the vertical and horizontal lengths of the circumscribing rectangle of the character, and the score in the case that the character E has all size information is stored in the form of a table.

For combinations of the first character type, the size information of the first character, the second character type, and the size information of the second character, in the case that the character of the first character type has the size information of this first character, the relative size dictionary 33 associates the score in the case that the character of the second character type has the size information of the second character as the relative size score, and stores it.

For example, FIG. 2B shows the state wherein, in relation to the character type E and the character type L, when the size information is the vertical and horizontal lengths of the circumscribing rectangle of the character, and the vertical length of the circumscribing rectangle of the character E is 8 and the horizontal length is 6, the score in the case that the character L has all size information is stored in the form of a table.

The size inference dictionary 34 stores the inference of the size information of the characters of a second character type in the case that the character of the first character type has the size information of the first character for the combinations of the first character type, the size information of the first character, and the second character type.

For example, FIG. 2C shows the state wherein, in relation to the character type E, the character type L, and the character type Z, the inferred value of the size information of the character L and the character Z are stored in the form of a table in the case that the size information is the vertical and horizontal lengths of the circumscribing rectangle, and the vertical length of the circumscribing rectangle of the character E is 8 and the horizontal length is 6.

The output device 4 outputs the correct word candidate along with the corrected character recognition score.

Figure 3:
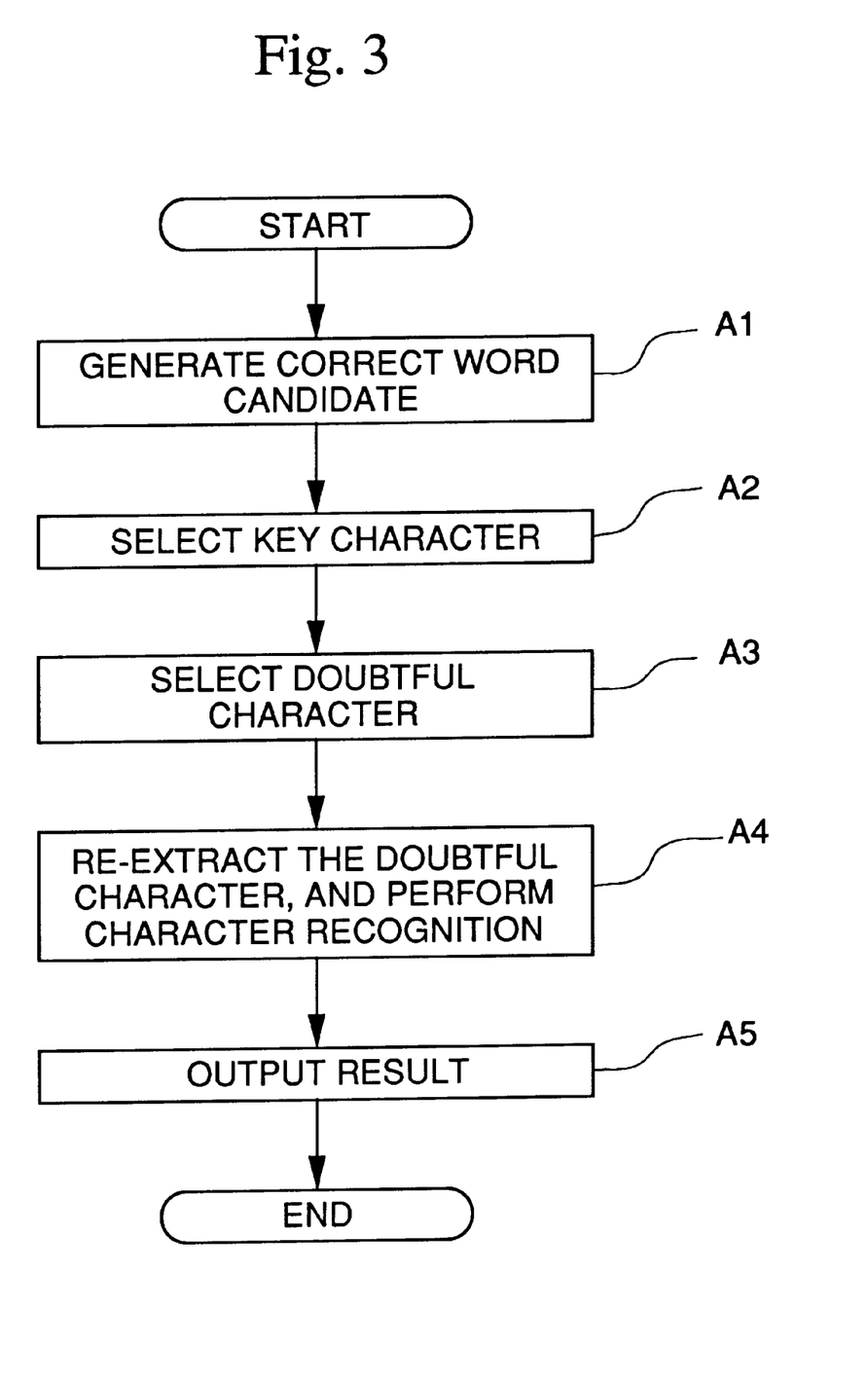
FIG. 3 is a flow chart showing the operation of the first embodiment of the present invention.
Figure 4:
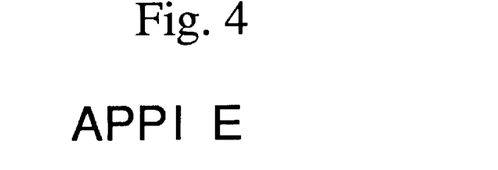
FIG. 4 is a figure showing an example of an input image.

Next, referring to the figures, the operation of the present embodiment will be explained in detail. FIG. 3 is a flow chart for explaining the operation of the present embodiment. In addition, as the recognition object word image, an image such as that shown in FIG. 4 is input.

First, in step A1, by applying the correct word candidate generation means 21 to the recognition object word image input from the input device 1, character extraction and character recognition are carried out, and the correct word candidate is generated.

For example, as it is carried out in the above-mentioned Japanese Patent Application, First Publication, No. Hei 6-348911, the recognition object word image is converted into two colors, the circumscribing rectangle of the black pixel concatenated component is detected from the two-color image, these are integrated into a larger circumscribing rectangle based on the size of the circumscribing rectangle and the distance between circumscribing rectangles, character recognition is carried out by assuming that one character each is included in each of the integrated circumscribing rectangles, and the character type and the character recognition score, which are the result, are obtained.

Additionally, by combining the obtained character types, it is possible to generate as correct word candidates several items having a high degree of agreement by collation with the correct word spelling.

Here, for the recognition object word image shown in FIG. 4, "APPLE" and "APPZE" are generated as correct word candidates.

Figure 5:
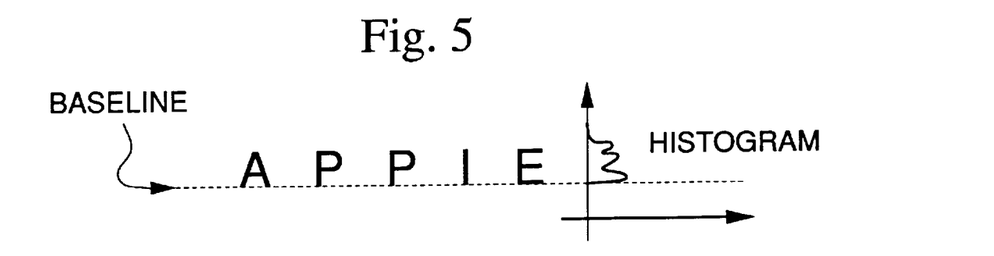
FIG. 5 is a drawing for explaining the method of finding the baseline.

Then, at the stage of step A1, the baseline of the correct word candidates is found. The baseline, as shown for example in FIG. 5, can be set by producing a histogram of the black pixels by scanning the word image one line at a time in the direction of the line of characters, searching for the amount of change in the value of the histogram from the top edge to the bottom edge, and making the line whose the amount of increase is equal to or greater then a predetermined value the baseline.

Next, in step A2, for each of the character candidates includes in each correct word candidate generated in step A1, the degree of independent confidence is calculated based on the recognition results and the size information of the relevant character candidate. Additionally, the character candidate whose degree of independent confidence is equal to or greater than a threshold value is made a key character.

The degree of independent confidence, for example, is calculated using the character recognition score of the character candidates, the independent size score obtained by referring to the independent size dictionary 31 based on the size information of the relevant character candidate, the height of the lower edge of the circumscribing rectangle of the character candidate seen from the baseline, the vertical and horizontal length of the circumscribing rectangle of this character candidate, and the gap between the circumscribing rectangle of the character candidate and the surrounding character candidates.

Figure 6:
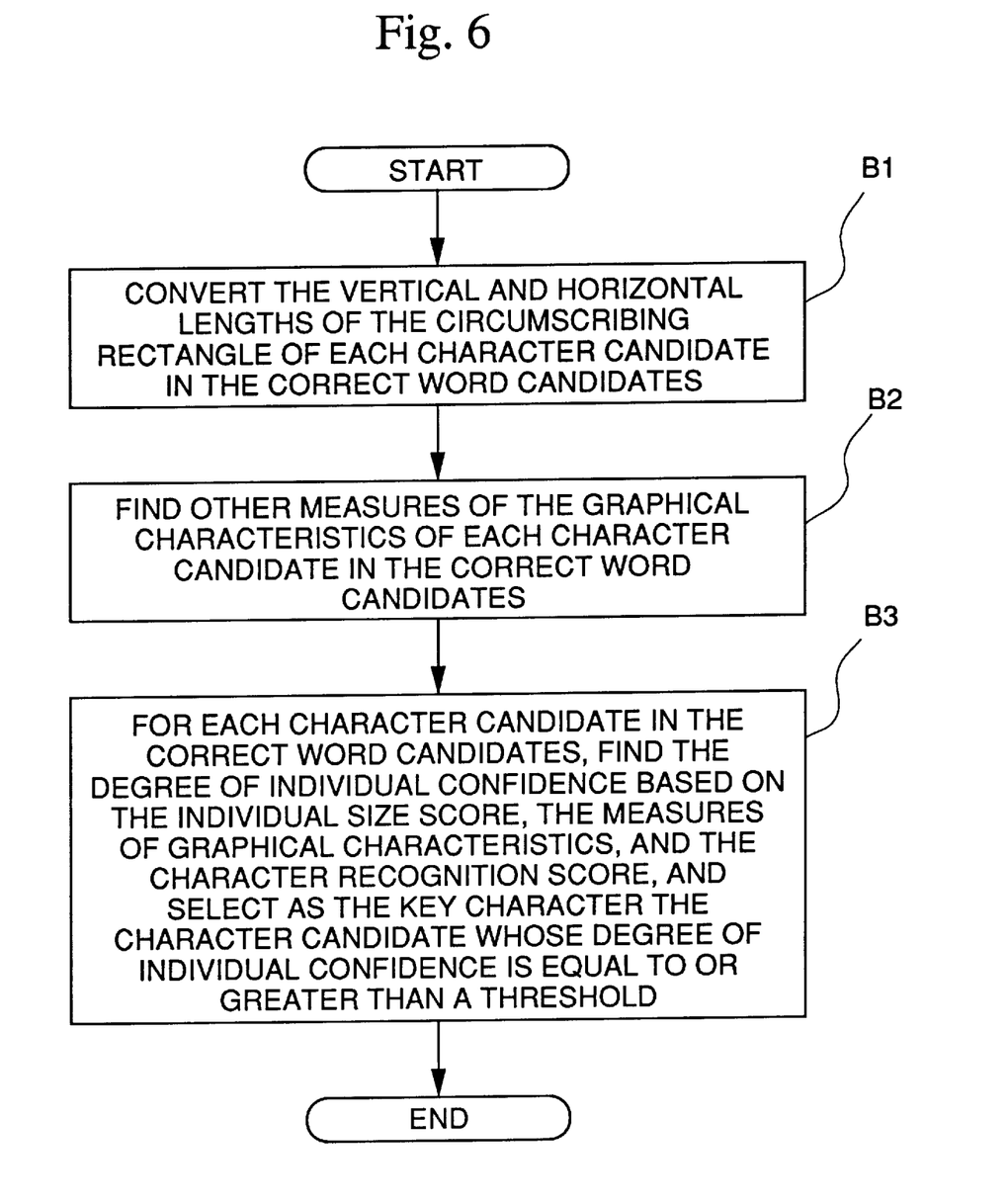
FIG. 6 is a flow chart showing the operation of step A2 in FIG. 3.

FIG. 6 is a flow chart for explaining the details of step A2.

First, in step B1, for each character candidate included in each correct word candidate, the independent size score is found by referring to the table in the independent size dictionary 31 based on the vertical and horizontal lengths of its circumscribing rectangle. FIG. 2A shows an example of this table.

This table can be produced by tabulating from the learned data two dimensional vectors $$x_i (i:=1, \ldots, n) \quad (1)$$

where n is the total amount of learned data included in this category comprising the vertical and horizontal lengths of the circumscribing rectangle for each character type, and by assuming that this distribution is a normal distribution $(\mu, \Sigma)$ of the average $\mu$ and the variance—covariance matrix $\Sigma$, inferring that the parameter $(\mu, \Sigma)$ is:

$$\mu' = Sum(1, n, x_i/n) \quad (2),$$

and $$\Sigma' = Sum(1, n, (x_i - \mu')(x_i - \mu')^T/(n-1)), \quad (3)$$

where superscript T expresses transposition, and making the square of the Mahalanobis distance from the average value $\mu'$ of the N $(\mu', \Sigma')$ equal to:

$$(x - \mu')^T \Sigma^{-1} (x - \mu') \quad (4).$$

However, Sum (,,) means taking the summation of the third term for all integers which can be included in the closed interval having the integer of the first term and the integer of the second term at the ends.

In the example in FIG. 4, when, for example, the vertical length of the circumscribing rectangle of the fifth character E is 8 and the horizontal length is 6, by referring to the table in FIG. 2A, the independent size score 20 can be found.

In step B2, for each character candidate included in each correct word candidate, the measures of the graphical characteristics besides the vertical and horizontal lengths of their circumscribing rectangle are found. As measures of the graphical characteristics, for example, the gap between the circumscribing rectangle of the character and the surrounding circumscribing rectangles, the height from the baseline of the correct word candidate to the lower edge of the circumscribing rectangle of the relevant character candidate, etc., can be used.

In step B3, for each character candidate included in each correct word candidate, the degree of independent confidence is found using the independent size score found in step B1, the measures of the graphical characteristics found in step B2, and the character recognition score found in step A1, and then the character candidate whose degree of independent confidence is equal to or greater than a threshold value is selected as a key character.

The degree of independent confidence can be found, for example, as follows. A learned character sample is provided in advance, and these samples are manually divided into those which should be made key characters and those which should not be made key characters. Then, for each character in both categories, a five dimensional vector comprising the independent size score, the gap between the circumscribing rectangles of the surrounding characters, the height from the word baseline to the bottom edge of the circumscribing rectangle of this character, and the character recognition score, is found, respectively, as:

$$Y_i^{(1)}, (i=1, \ldots, n_1) \quad (5),$$

for samples which should be made key characters, and $$Y_i^{(2)}, (i=1, \ldots, n_2) \quad (6),$$

for samples which should not be made key characters. Subsequently, $$\mu^{(j)} = Sum(1, n_j, y_i^{(j)})/n_j (j=1,2) \quad (7),$$

and $$\Sigma'_{(j)} = Sum(1, n_j, (y_i^{(j)} - \mu^{(j)})(y_i^{(j)} - \mu^{(j)})^T)/(n_j - 1)(j=1,2) \quad (8)$$

are calculated. Additionally, setting this five dimensional vector related to each of the character candidates included in the correct word candidate to y, the value of the degree of independent confidence is:

$$(y - \mu^1)^T \Sigma'_{(1)}^{-1} (y - \mu^{(1)}) - (y - \mu^{(2)})^T \Sigma'_{(2)}^{-1} (y - \mu^{(2)}). \quad (9)$$

The threshold value used in the key character selection in this case can be 0, for example.

In the example in FIG. 4, it is assumed that the fifth character, the character E, is selected as the key character.

In step A3, for each character candidate besides the key character included in each correct word candidate, the degree of relative confidence is calculated based on the recognition result and the size information of the relevant character candidate. Additionally, the character candidate whose degree of relative confidence is equal to or less than a threshold value is selected as a doubtful character.

The degree of relative confidence can be calculated, for example, using the character recognition score of this character candidate, the relative size score obtained by referring to the relative size dictionary 33 based on size information of the key character and the relevant character candidate, the height of the lower edge of the circumscribing rectangle seen from the baseline, the vertical and horizontal height of the circumscribing rectangle of this character candidate, and the gap between the circumscribing rectangles of the character candidates surrounding this character candidate.

Figure 7:
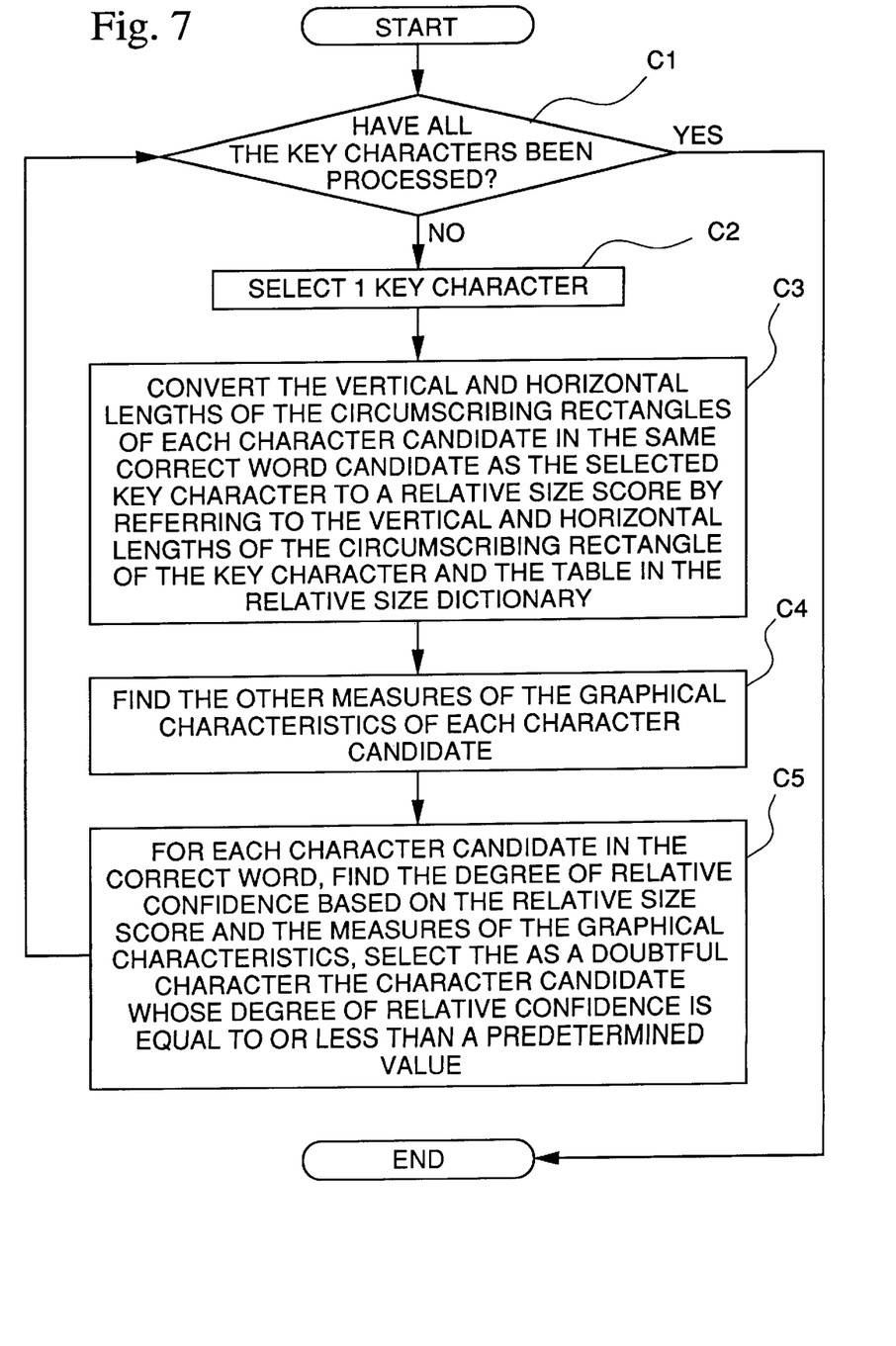
FIG. 7 is a flow chart showing the operation of step A3 in FIG. 3.

FIG. 7 is a flow chart for explaining step A3 in detail.

In step C1, it is determined whether or not the processing for step C3 and before have been carried out for all key characters obtained in step A2, and if all processing is complete, it ends. If not, then the processing proceeds to step C2.

In step C2, among the key characters obtained in step A2, one is selected for which the processing of step C3 and before have not been carried out. The order of selection can be any suitable order, but for example, the order form the highest degree of independent confidence is possible.

In step C3, for each character candidate included in the same correct word candidate as the key characters selected in step C2, the relative size score is found by referring to the table in the relative size dictionary 33 based on the vertical and horizontal lengths of its circumscribing rectangle and the vertical and horizontal lengths of the circumscribing rectangle of the key character selected in step C2. FIG. 2B is an example of this table.

This table, for example, can be produced by tabulating the learned data for any two arbitrary characters i and j which are in the same word, and for each of the characters i and j of the learned data, finding the four dimensional vector (x1, y1, x2, y2) comprising the vertical and horizontal lengths of other circumscribing rectangles, finding the inferred value of these parameters by assuming that the distribution Pij (x1, y1, x2, y2) of this four dimensional vector is four dimensional normal distribution, calculating the average value of the conditional distribution Pij (x2, y2, x1, y1) of the vertical and horizontal lengths (x2, y2) of the circumscribing rectangles of the characters with other character types when the vertical and horizontal lengths (x1, y1) of the circumscribing rectangles of the characters with one character type are given, and making the relative size score the square of the Mahalanobis distance from this average value. It is possible to carry out in the same manner as step B1 the method of finding the inferred values of the parameters of the normal distribution and the method of finding the Mahalanobis distance In the example in FIG. 4, for the correct word candidate "APPLE", suppose that the vertical and horizontal lengths of the extracted area of the character candidate corresponding to the fourth character 'L' are respectively 8 and 2. The vertical and horizontal lengths of the extraction area of the of the character candidate corresponding to the fifth character 'E', which is a key character, are respectively 8 and 6, and based on this, by referring to the table in FIG. 2B, the relative size score 80 of the character candidate corresponding to the fourth character 'L' is found.

In step C4, for each character candidate included in the same correct word candidate as the key character selected in step C2, the measures of the graphical characteristics other than the vertical and horizontal lengths of its circumscribing rectangle are found. As measures of graphical characteristics, for example, the gap between the circumscribing rectangle of this character and the circumscribing rectangle of the surrounding characters, the height from the base line of the correct word candidate to the lower edge of the circumscribing rectangle of the relevant character candidate, etc., can be used. Because these are the same as those found in step B4, in step B4 it is possible to store these values in memory for use here.

In step C5, for each character candidate included in the same correct word candidate as the key character selected in step C2, the degree of relative confidence is found using the relative size score found in step C3 and the measures of graphical characteristics found in step C4, and a character candidate whose degree of relative confidence is equal to or lower than a threshold value is selected as a doubtful character.

The degree of relative confidence can be found, for example, as follows. A learned character sample is provided in advance, and the samples are manually divided into those which should be made key characters and those which should not be made key characters. Then the degree of relative confidence can be found in the same manner as in step B3. The threshold value is set, for example, to 0.

In the example in FIG. 4, suppose the fourth character L in the correct word candidate "APPLE" and the fourth character 'Z' in "APPZE" are selected as doubtful characters.

In step A4, by using the character reconfirmation means 24 and the size inference dictionary 34, for each of the doubtful characters selected in step A3, the character extraction and character recognition are carried out again, and based on this result, the character recognition score of each doubtful character is corrected.

Figure 8:
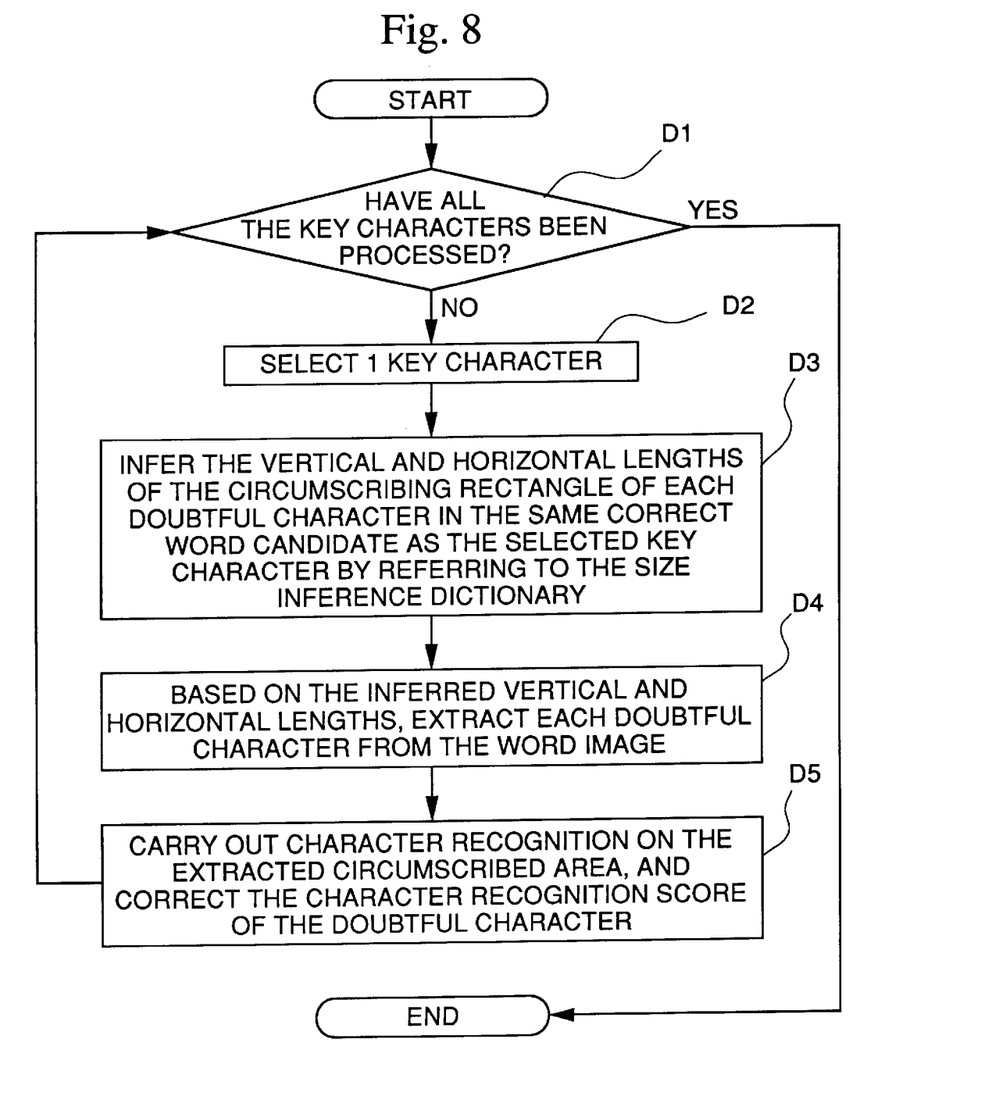
FIG. 8 is a flow chart showing the operation of step A4 in FIG. 3.

FIG. 8 is a flow chart for explaining the details of step A4.

In step D1, it is determined whether or not the processing for step D3 and before have been carried out for all key characters obtained in step A2, and if all processing is complete, it ends. If not, then the processing proceeds to step D2.

In step D2, among the key characters obtained in step A2, one is selected for which the processing of step D3 and before have not been carried out. The order of choice can be any suitable order, but for example, the order from the highest degree of independent confidence is possible.

In step D3, for each doubtful character candidate included in the same correct word candidates as the key characters selected in step D2, the size information of the extracted area of the doubtful character is determined by referring to the table in the size inference dictionary 34 based on the vertical and horizontal lengths of its circumscribing rectangle and the key character. FIG. 2C is an example of this table.

This table can be produced by finding the inferred value of the vertical and horizontal lengths (x2, y2) of the circumscribing rectangle of the character type j, when the vertical and horizontal lengths of the circumscribing rectangle of the character type i are (x1, y1), as the maximum inferred value:

$$(x2,y2)=ar_{ij}gmaxPij(x2,y2|x1,y1) \qquad (10),$$

using Pij obtained in step C3.

In the example in FIG. 4, for the correct word candidate "APPLE", the inferred values of the vertical and horizontal lengths of the extraction area of the character candidate corresponding to the fourth character L are respectively 8 and 7, which are obtained by referring to the table in FIG. 2C. In addition, for the correct word candidate "APPZE", the inferred values of the vertical and horizontal lengths of the extraction area of the character candidate corresponding to the fourth character Z are similarly 8 and 7, respectively.

In step D4, for each doubtful character included in the same correct word candidate as the key character selected in step D2, the rectangular area is extracted from the recognition object word image based on the vertical and horizontal lengths of the extracted area determined in step D3.

However, because the extraction position is not determined by only the vertical and horizontal lengths of the extraction area determined in step D3, a plurality of rectangular areas having the vertical and horizontal lengths determined in step D3 are set based on the word image, then an evaluation of the graphical characteristics of the respective rectangular areas in step D3 is carried out, a rectangular area fulfilling predetermined conditions is selected, and extraction is carried out.

Figure 9:
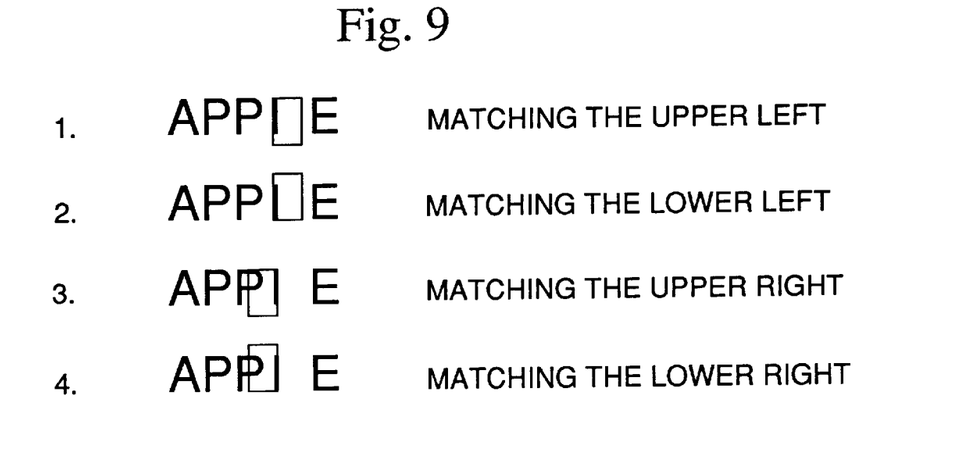
FIG. 9 is a drawing for explaining the way the extraction area is set.

For example, as shown in FIG. 9, the rectangular area having in common the circumscribing rectangle of the doubtful character and a corner is set. Because there are four corners in the rectangle, there are four rectangular areas which are set. The graphical characteristics are found for these four rectangular areas. As graphical characteristics, for example, the height of the lower edge of the rectangular area seen from the baseline, and the gap between circumscribing rectangles of the surrounding character candidates can be used.

The method of selecting the rectangular areas can be realized, for example, in the same manner as step B3. That is, an learned character sample is provided in advance, and the samples are manually divided into those which should be made key characters and those which should not be made key characters. Here, extraction should not be carried out if, for example, there is a large overlapping with adjacent characters. Additionally, in respective sets, the characteristic vectors having the above graphical characteristics as elements are found from each sample, and the average of the characteristic vectors and the covariant matrices are found for each set. In selecting a rectangular area, for these characteristic vectors obtained respectively for these four rectangular areas, the Mahalanobis distance from each set is found using this average value and the covariant matrix, and in the case that the average value of the set which should be extracted is close, this rectangular area is selected.

In the example in FIG. 9, 1 and 2 in FIG. 9 are selected and extracted, and 3 and 4 in FIG. 9 are not selected because the overlap with the adjacent character candidate is large.

In step D5, character recognition is carried out for the rectangular area extracted in step D4. At this time, the outer frame of the rectangular area extracted in step D4 is made to match a character frame in the character recognition dictionary. Additionally, depending on the result of the character recognition, the character recognition score of the doubtful character is corrected. As a method of correction, for example, eliminating the character recognition score up to that point for the doubtful character and overwriting it with the best among the character recognition scores obtained at this point can be considered.

In the example in FIG. 9, when character recognition is carried out by matching a character frame for 1 and 2 in FIG. 9, both 1 and 2 in FIG. 9 have a higher degree of similarity to the character L than the character Z, and the character recognition score of the fourth character candidate, which was a doubtful character, will be corrected, and that for the character type L becomes the largest.

In step A5, by using the output device 4, the correct word candidate is output along with the corrected character recognition score.

Next, in the conventional art, in contrast to the degree of similarity for the character Z being higher than that of the character L, in the present invention, the degree of similarity of the character L is higher than that of the character Z. This will be explained using FIGS. 10A to 10F.

Figure 10A:
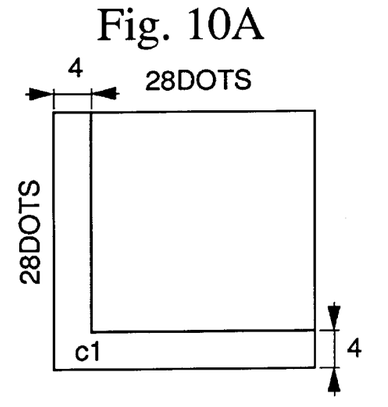
FIGS. 10A to 10F are drawings for explaining the mistake in the degree of similarity with respect to the character L and the character Z.
Figure 10B:
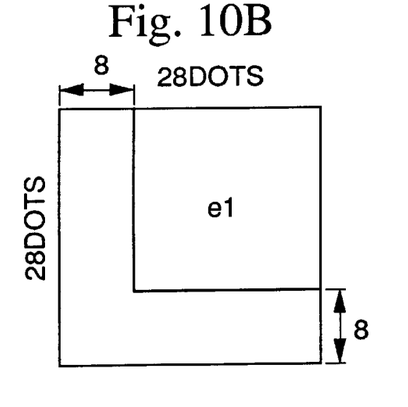
Figure 10C:
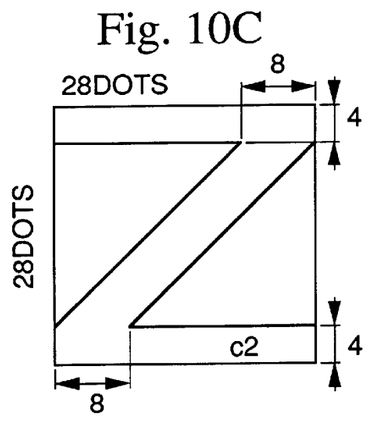
Figure 10D:
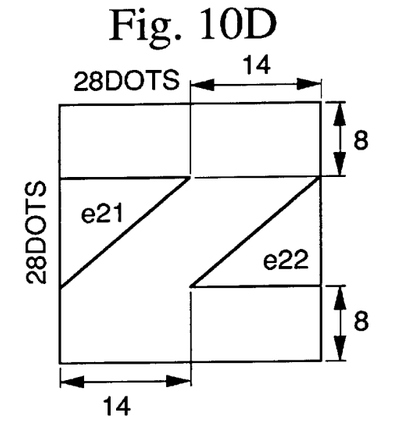

Here, assume that in the character recognition dictionary two types of template are prepared for one character type, and that for the character type L, FIGS. 10A and 10B have been provided, and for the character type Z, FIGS. 10C and 10D have been provided. The role of these two types of template is to check whether or not there are white pixels in an area which should have black pixels, and to check whether or not there are black pixels in an area which should have white pixels. FIGS. 10A and 10C are for the former, and c1 and c2 represent areas which should have black pixels. In addition, FIGS. 10B and 10D are for the later, and e1, e21, and e22 represent areas in which there should be white pixels.

As the object of character recognition, the extracted area is transformed so that its outer shape matches the character frame of the template. Moreover, assume that the size of the template is 28×28.

Figure 10E:
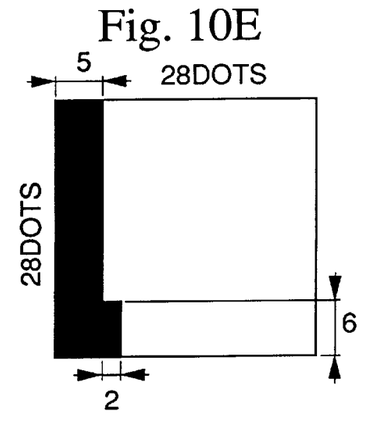
Figure 10F:
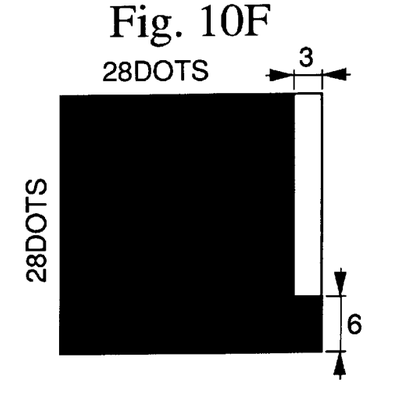

In the example in FIG. 4, because the fourth character has a missing part, when transformed so as to match as is, it becomes like FIG. 10F. In contrast, in the present invention, because it is transformed so as to match after extraction from the area such as that shown in 1 and 2 of FIG. 9, it becomes like FIG. 10E. That is, FIG. 10F represents object recognition in the conventional art, and FIG. 10E represents the recognition object in the present invention.

First, the degree of similarity between FIG. 10F and the character type L is found. FIG. 10F and FIG. 10A are superimposed, and for the area c1 which should have black pixels and the white pixel area of FIG. 10F, the area S1 of the overlapping part is calculated. This can be taken to signify the penalty of the presence of white pixels in an area that originally should have black pixels, and in the example in the figure, S1=0. In addition, FIG. 10F and FIG. 10B are superimposed, and for the area e1 which should have white pixels and the black pixel area of FIG. 10F, the area S2 of the overlapping part is calculated. This can be taken to signify the penalty of the presence of black pixels in an area that originally should have white pixels, and in the example in the figure, S2=340. If the degree of similarity is defined as 1000−S1−S2, the degree of similarity of FIG. 10F and character type L is 660.

Next, the degree of similarity between FIG. 10F and the character type Z is found. FIGS. 10F and 10C are superimposed, and for the area c2 which should have black pixels and the white pixel area of FIG. 10F, the area S1 of the overlapping part is calculated. In the example in the figure, S1=28. Next, FIG. 10F and FIG. 10D are superimposed, and for e21 and e22 which should have white pixels and the black pixel areas of FIG. 19F, the area S2 of the overlapping part is calculated. In the example in the figure, S2=150. As a result of calculating 1000−S1−S2, the degree of similarity between FIG. 10F and character type Z is 822.

Then, for FIG. 10F, it is clear that the degree of similarity, 822, of the character type Z has become larger than the degree of similarity, 660, of the character type L.

In contrast, when the degree of similarity with the character type is found in the same manner for FIG. 10E, in the example in the figure, S1=84 and S2=0, giving a degree of similarity of 916. Additionally, the degree of similarity with character type Z in the example in the figure is S1=320 and S2=332, giving a degree of similarity of 348. Thus, for FIG. 10E, it is clear that the degree of similarity of the character type L, 916, becomes larger than the degree of similarity of the character type Z, 348.

Second Embodiment

Figure 11:
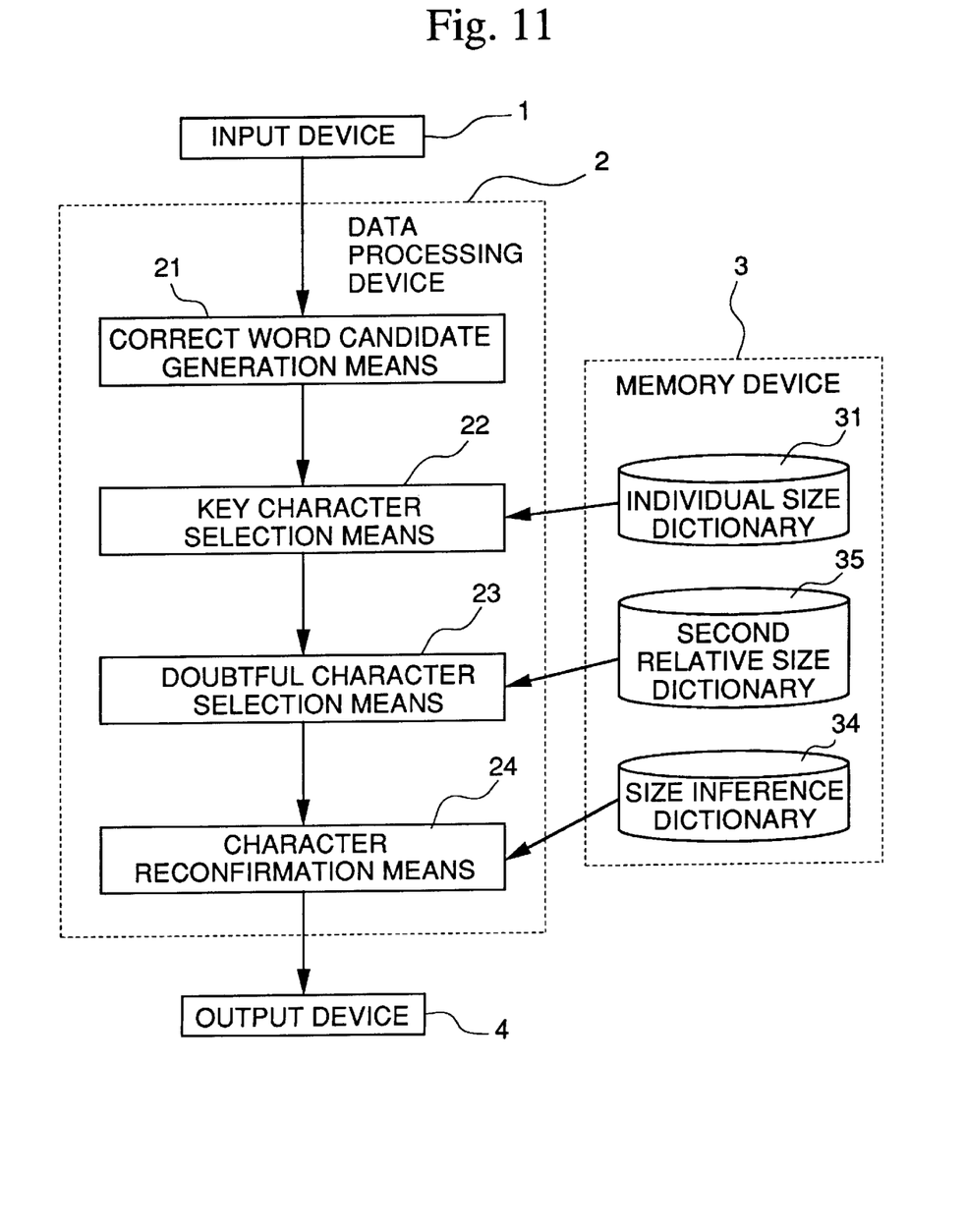
FIG. 11 is a block diagram showing the structure of the second embodiment of the present invention.

Next, the second embodiment of the present invention will be explained in detail referring to the figures. FIG. 11 is a block diagram for explaining the structure of the present embodiment. Referring to FIG. 11, the structure of the present embodiment differs from the structure of the first embodiment shown in FIG. 1 in that the second relative size dictionary 35 is substituted for the relative size dictionary 33.

Figure 12:
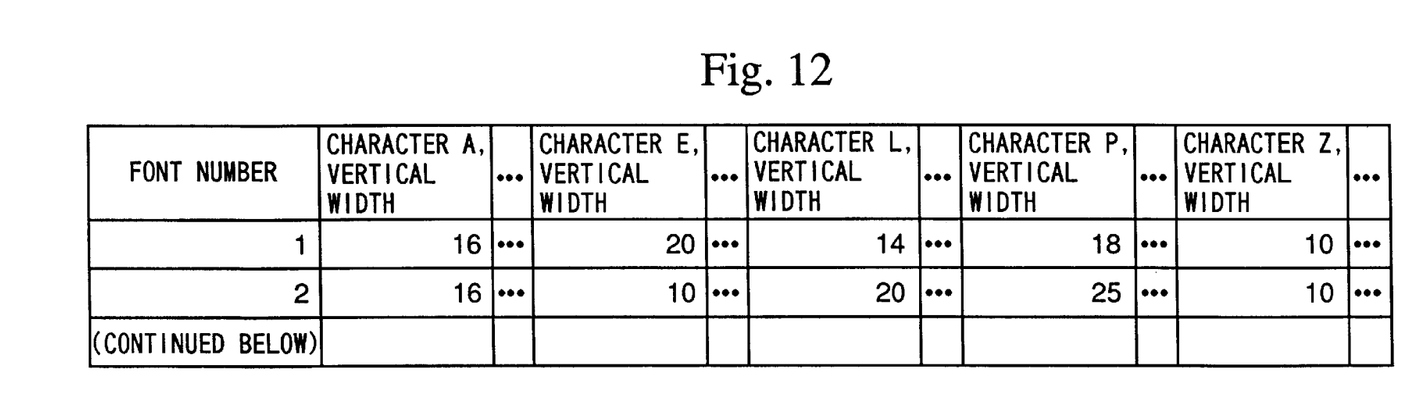
FIG. 12 is a drawing showing an example of the second relative size dictionary.

FIG. 12 is a drawing for explaining a concrete example of the second relative size dictionary 35. The second relative size dictionary 35 stores the ratio related to the size information of each character for the character set having an identical font.

For example, using the horizontal length of the circumscribing rectangle of the character as the size information, FIG. 12 shows the storage in the form of a table of the ratios 16:20:14:18:10 of the horizontal lengths of the circumscribing rectangles for each of the characters A, E, L, P, Z for a character set having font number 1, and the ratios 16:10:20:25:10 of the horizontal lengths of the circumscribing rectangles for each of the characters A, E, L, P, and Z for the character set having font number 2.

This table is produced, for example, by preparing in advance a learned sample table for each font, and actually measuring the horizontal width of the circumscribing rectangle of the sample data for each character, and finding the ratios.

Next, the operation of the present embodiment is explained in detail while referring to the figures. Except for step A3, the operation of the present embodiment is the same as the operation of the first embodiment shown in FIG. 3.

In step A3, for each of the character candidates included in each correct word candidate, the present embodiment calculates the degree of relative confidence by referring to the second relative size dictionary 35 based on the size information of the key character and the relevant character candidate, and selects the character candidate whose degree of relative confidence is equal to or below a threshold value as a doubtful character.

Figure 13:
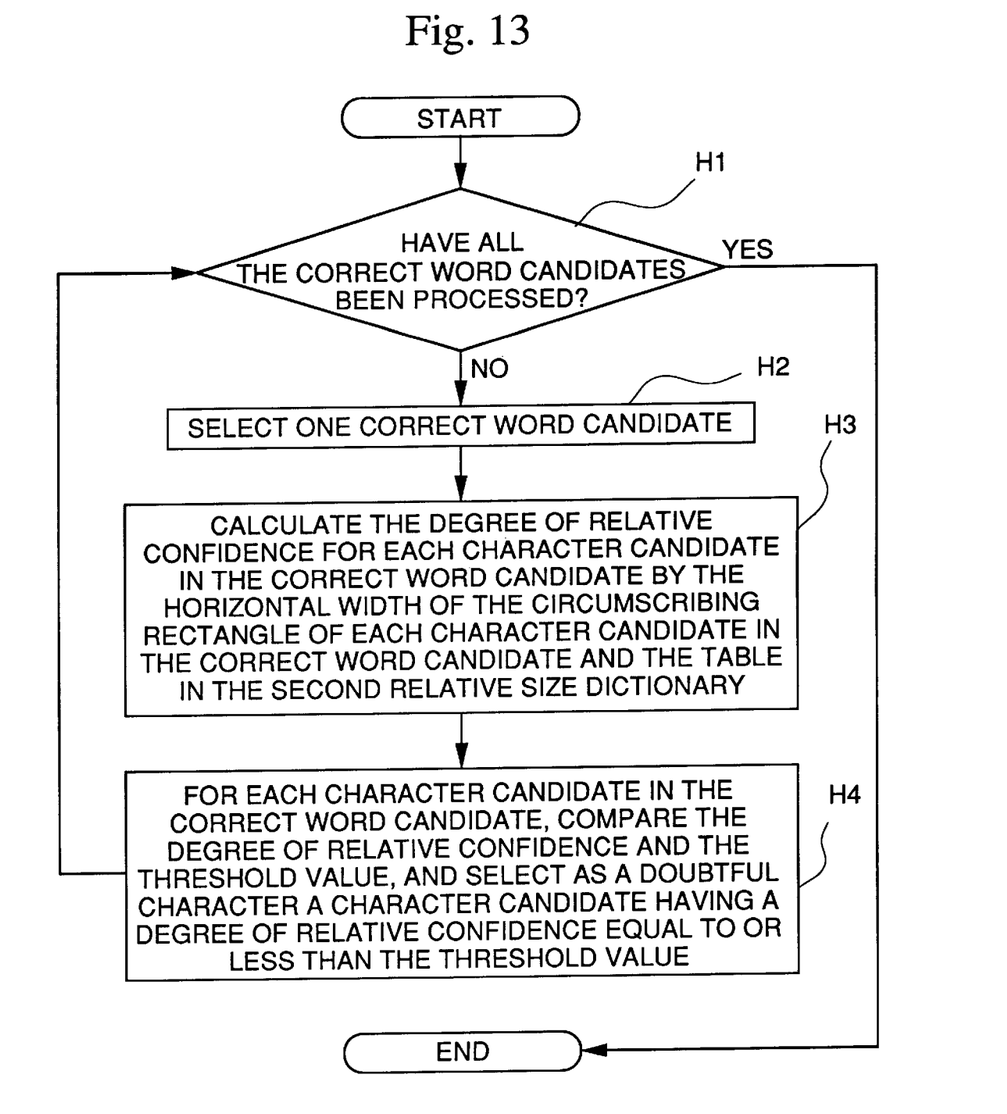
FIG. 13 is a flow chart showing the operation of step A3 in FIG. 3 in the second embodiment.

FIG. 13 is a flow chart for explaining the details of step A3 in the present embodiment.

In step H1, it is determined whether or not the processing for step H3 and before have been carried out for all correct word candidates obtained in step A1, and if all processing is complete, it ends. If not, then the processing proceeds to step H2.

In step H2, among the correct word candidates obtained in step A1, one is selected for which the processing of step H3 and before have not been carried out.

In step H3, for each of the character candidates included in the correct word candidate selected in step H2, the degree of relative confidence is calculated as shown below while referring to the second relative size dictionary 35.

For character candidate P included in the correct word candidate, assume that the results of recognition are $C_1, \ldots, C_P$, and that the horizontal widths of the circumscribing rectangles are $X_1, \ldots, X_P$. First, the font having the size information most closely resembling the size information of the character candidate set in the correct word candidate is selected. Concretely, the i and k which minimize $$F_i(k) = \sum_{j=1}^{p} \text{Key}(j) |k x_i(C_j) - X_j| \tag{11}$$

are found, and labeled i' and k'. Here, i represents the font number, and i' represents the font number of the selected font. Additionally, $x_i(C_j)$ represents the ratio of the size information of character type $C_j$ in the font having font number i obtained by referring the second relative size dictionary. In addition, Key (j) is a function taking the value 2 if the $j^{th}$ character in the correct word candidate is a key character, and the value 1 if not, and has the function of increasing the weight of the error with respect to the key character.

After selecting the font, the degree of relative confidence of each character candidate is calculated from $-|k'x_{\{i'\}}(C_j)-X_{\{j\}}|$.

For example, in the correct word candidate "APPLE", assume that the horizontal lengths $X_1, \ldots X_P$ of the circumscribing rectangles of each candidate character are in order 8, 9, 9, 2, and 10. Then, by referring to the second relative size dictionary in FIG. 2, for the font having font number 1, because F1 (k)=|16k−8|+|18k−9|+|18k−9|+|14k−2|+2|20k−10|, k will minimize this when k=0.5. Here, if Fi (k) is minimized when i=1, the degrees of relative confidence for each character in the correct word candidate "APPLE" are, in order, 0, 0, 0, −5, 0.

In step H4, the degree of relative confidence and the threshold value for each character candidate among the correct word candidates calculated in step H3 are compared, and the character candidate having a degree of relative confidence equal to or below the threshold value is selected as a doubtful character.

For example, if the threshold value is −3, in the above example, the character candidate corresponding to the fourth character L in the correct word candidate "APPLE" is selected as a doubtful character.

Third Embodiment

Figure 14:
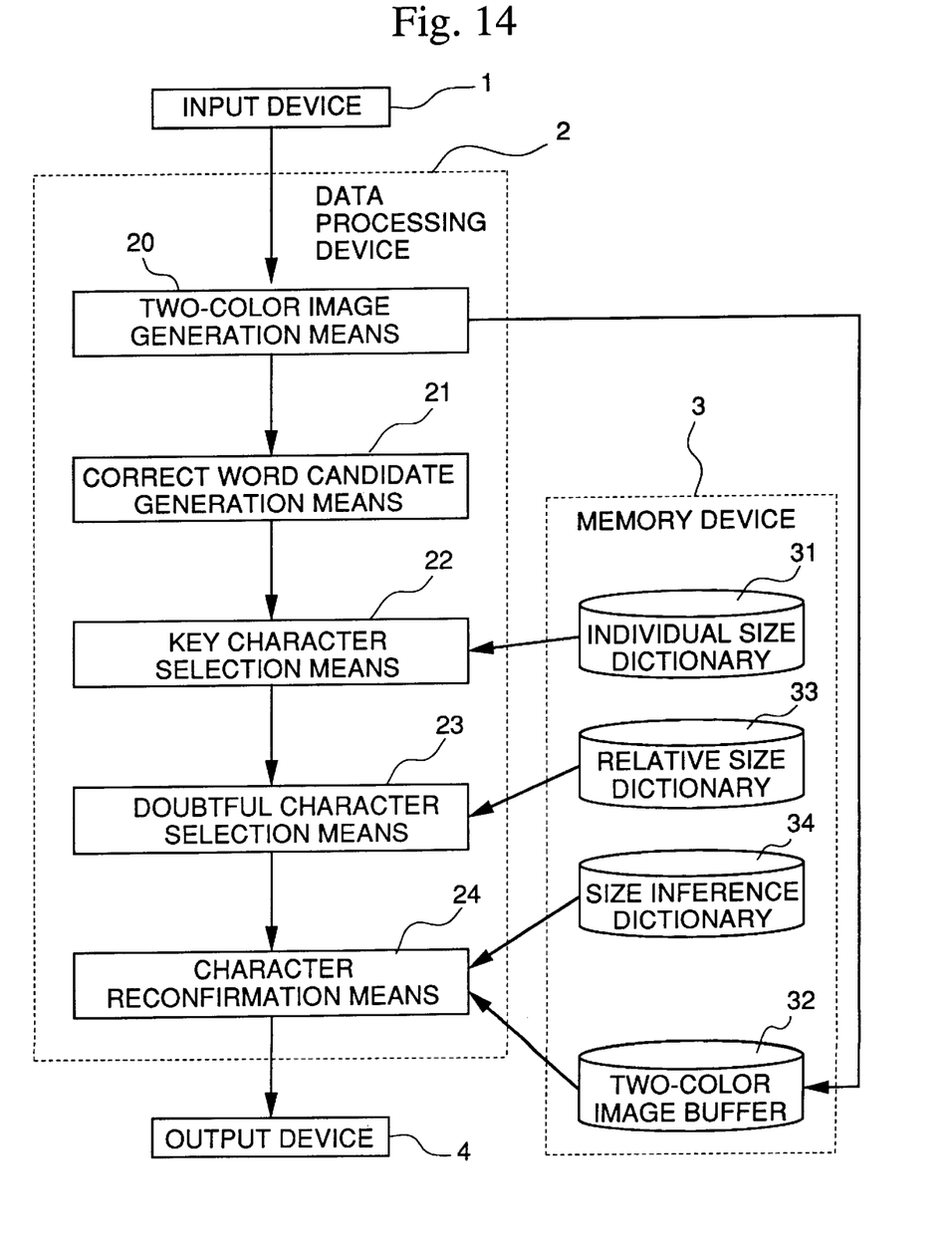
FIG. 14 is a block diagram showing the structure of the third embodiment of the present invention.

Next, the structure of the third embodiment of the present invention will be explained in detail referring to the figures. FIG. 14 is a block diagram for explaining the structure of the present embodiment. Referring to FIG. 14, the structure of the present embodiment differs from the structure of the first embodiment shown in FIG. 1 in that there is a two-color image generation means 20 and a two-color image buffer 32.

When the recognition object word image has multiple colors and the character recognition means used only has a two-color image as an object, it is necessary to carry out character recognition after converting it into a two-color image. However, there are many cases wherein there is no threshold value which can completely separate the background and the characters. Thus, in the two-color image generation device 20, a plurality of two-color images are generated using a plurality of threshold values, and these are stored in the two-color image buffer.

In the two-color image generation device 20, one among the generated two-color images is selected and output to the correct word candidate generation means 21, and the other two-color images are output to the two-color image buffer.

In the correct word candidate generation means 21, the key character selection means 22, and the doubtful character selection means 23, the same processing as that in the first embodiment is carried out using this selected two-color image.

The character reconfirmation means 24 determines the extraction area in the same manner as the first embodiment using this selected two-color image, extracts the rectangular area at the same position as the above determined extraction area for this selected two-color image and a two-color image read from the two-color image buffer, and carries out character reconfirmation of the doubtful characters.

The effect of the present invention is to allow carrying out of a more highly reliable character recognition for characters whose word image is missing a part. The reason is that among the character candidates included in the word image, by inferring size information of a candidate character having a missing part from the size information of a character candidate without any missing parts, it is possible to avoid the degree of similarity becoming low when checking the match between the circumscribing rectangle of the character candidate having a missing part and the character frames of the template in the character recognition dictionary.

What is claimed is:

1. A character recognition means characterized in providing:

a word candidate generation means which generates word candidates by carrying out character recognition by extracting a character candidates for a word image which is the recognition object, and combining said word candidates based on the character types which are the result of character recognition;

an independent size dictionary which stores as an independent size score the score in the case that the character of said character type has size information for this character for a combination of the character type and the size information of the character;

a key character selection means which finds the independent size score by referring to said independent size dictionary that makes the results of the recognition of the relevant character candidate and the size information the character type and size information of the character, calculates the degree of independent confidence of the relevant character candidate based at least on the recognition result of said individual size score and the relevant character candidate, selects said character candidate as the key character when said calculated degree of individual confidence is higher than a previously stored specified value, and selects at least one key character from the character candidates whose degree of independent confidence is high when none were selected as key characters;

a relative size dictionary which, for combinations of a first character type, a first character size information, a second character type, and a second character size information, associates and stores as the relative size score the score in the case that the character of said second character type has the size information of said second character when the character of said first character type has the size information of said first character;

a doubtful character selection means which, for character candidates not selected as said key characters from among the character candidates included in said word candidate, uses the recognition results of the relevant character candidate and the size information as the first character type and the size information of the first character, uses the recognition results of at least one key character included in the same word candidate as the recognition result of the relevant character candidate as the second character type and the size information of the second character to find the relative size score by referring to the relative size dictionary, calculates the degree of relative confidence of the relevant character candidate based on at least said relative size score, and when said calculated degree of relative confidence is lower than a previously stored specified value, the relevant character candidate is selected as a doubtful character;

a size inference dictionary which, for combinations of a first character type, size information of the first character, and the second character type, stores an evaluation of the size information of the character of said second character type when the character of said first character type has the size information of said first character; and a character reconfirmation means which, for the character candidates selected as said doubtful characters, uses the recognition results of the relevant character candidate as the second character type, uses the recognition result of the key character and the size information used when selecting the doubtful character for the relevant character candidate as the first character type and the size information of the first character, calculates the evaluation of the size information of the relevant character candidate by referring to the size inference dictionary, sets the extraction area based on the size information given by said evaluation based on the position of the relevant character candidate in said word image, and carries out character recognition with the external frame of said set extraction area being the circumscribing rectangle of the character.

2. A character recognition device according to claim 1 provided with a second relative size dictionary which stores the ration relating to the size information of each character for the character set having an identical font, wherein:

said doubtful character selection means calculates for each character candidate set included in said word candidate the degree of relative confidence by referring to the second relative size dictionary based on the size information of each character candidate and whether or not the relevant character candidate has been selected as a key character, and when said calculated degree of relative confidence is lower than a predetermined value stored in advance, this character candidate is selected as a doubtful character.

3. A character recognition device according to claim 1 having a two-color image generation means which makes two-color images for word images which are the recognition object according to a plurality of differing thresholds, and generates a plurality of two-color images and a two-color image buffer which stores said plurality of two-color images, and wherein:

said character reconfirmation means sets the extraction area at the same position as the extraction area set for said word image for said plurality of two-color images stored in said two-color image buffer as well when setting the extraction area of said word image, and carries out character recognition using the external frame of the extracted area as the circumscribing rectangle of the character for the respectively set extraction areas of said word images and said plurality of two-color images.

* * * * *